United States Patent
Van Phan et al.

(10) Patent No.: US 12,396,012 B2
(45) Date of Patent: Aug. 19, 2025

(54) APPARATUS AND METHOD FOR SIDELINK DISCONTINUOUS RECEPTION

(71) Applicant: Nokia Technologies Oy, Espoo (FI)

(72) Inventors: Vinh Van Phan, Oulu (FI); Ling Yu, Kauniainen (FI)

(73) Assignee: Nokia Technologies Oy, Espoo (FI)

( * ) Notice: Subject to any disclaimer, the term of this patent is extended or adjusted under 35 U.S.C. 154(b) by 358 days.

(21) Appl. No.: 18/044,123

(22) PCT Filed: Aug. 31, 2021

(86) PCT No.: PCT/IB2021/057961
§ 371 (c)(1),
(2) Date: Mar. 6, 2023

(87) PCT Pub. No.: WO2022/058827
PCT Pub. Date: Mar. 24, 2022

(65) Prior Publication Data
US 2023/0371050 A1 Nov. 16, 2023

Related U.S. Application Data

(60) Provisional application No. 63/080,972, filed on Sep. 21, 2020.

(51) Int. Cl.
*H04W 72/40* (2023.01)
*H04W 72/51* (2023.01)
*H04W 76/28* (2018.01)

(52) U.S. Cl.
CPC ........... *H04W 72/40* (2023.01); *H04W 72/51* (2023.01); *H04W 76/28* (2018.02)

(58) Field of Classification Search
CPC ..... H04W 72/40; H04W 76/28; H04W 72/51; H04W 72/0406; H04W 72/20;
(Continued)

(56) References Cited

U.S. PATENT DOCUMENTS

2021/0051525 A1* 2/2021 Cao ...................... H04W 72/542
2021/0337519 A1* 10/2021 Farag .................... H04L 5/0078
(Continued)

FOREIGN PATENT DOCUMENTS

WO WO 2020/091494 A1 * 5/2020

OTHER PUBLICATIONS

U.S. Appl. No. 63/014,031_Specification_filed Apr. 22, 2020 (Year: 2020).*
(Continued)

*Primary Examiner* — Rushil P. Sampat
(74) *Attorney, Agent, or Firm* — Nokia Technologies Oy

(57) ABSTRACT

One embodiment is directed to a method. The method comprises receiving a configuration of a resource pool for sidelink communication; determining there is a need for assistance from one or more other UEs in proximity in resource reservation or resource selection from the configured resource pool for SL communication of the UE; sending a request over SL for the needed assistance from the one or more other UEs in proximity based on the determination; monitoring and receiving possible response from the one or more other UEs in proximity which may include recommended resource from the configured resource pool for the request of UE; selecting resource for SL communication of the UE by taking into account the received response; and performing SL communication using the selected resource.

19 Claims, 5 Drawing Sheets

(58) Field of Classification Search
CPC ..... H04W 72/02; H04W 72/10; H04W 72/56; H04W 76/14; H04L 5/0053; H04L 5/0048; H04L 5/0055
See application file for complete search history.

(56) References Cited

U.S. PATENT DOCUMENTS

| | | | |
|---|---|---|---|
| 2021/0400639 A1* | 12/2021 | Lee | H04W 24/10 |
| 2022/0022179 A1* | 1/2022 | Fouad | H04W 4/40 |
| 2022/0030575 A1* | 1/2022 | Farag | H04L 5/0053 |
| 2023/0118247 A1* | 4/2023 | Lin | H04W 72/044 370/329 |

OTHER PUBLICATIONS

"3rd Generation Partnership Project; Technical Specification Group Radio Access Network; Study on evaluation methodology of new Vehicle-to-Everything (V2X) use cases for LTE and NR; (Release 15)", 3GPP TR 37.885, V15.3.0, Jun. 2019, pp. 1-38.

"New WID on NR sidelink enhancement", 3GPP TSG RAN Meeting #86, RP-193231, Agenda: 9.1.1, LG Electronics, Dec. 9-12, 2019, 6 pages.

"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.

International Search Report and Written Opinion received for corresponding Patent Cooperation Treaty Application No. PCT/IB2021/057961, dated Dec. 1, 2021, 15 pages.

"Considerations on inter-UE coordination for mode 2 enhancements", 3GPP TSG RAN WG1 #102-e, R1-2005546, Agenda: 8.11.2.2, Fujitsu, Aug. 17-28, 2020, 11 pages.

"Sidelink resource allocation for Power saving", 3GPP TSG RAN WG1 #102-e, R1-2005839, Agenda: 8.11.2.1, Lenovo, Aug. 17-28, 2020, 7 pages.

"Further details of Uu RRC procedures for sidelink", 3GPP TSG-RAN WG2 Meeting#107bis, R2-1913708, Agenda: 6.4.2, Huawei, Oct. 14-18, 2019, 8 pages.

"KI#1, new solution: PC5 DRX configuration for QoS-aware and power-efficient communication", SA WG2 Meeting #140e, S2-2006597, Agenda: 8.12, Nokia, Aug. 19-Sep. 2, 2020, 5 pages.

* cited by examiner

APPARATUS AND METHOD FOR SIDELINK DISCONTINUOUS RECEPTION

RELATED APPLICATION

This application claims priority to PCT Application No. PCT/IB2021/057961, filed on Aug. 31, 2021, which claims priority to U.S. Application No. 63/080,972, filed on Sep. 21, 2020, each of which is incorporated herein by reference in its entirety.

CROSS-REFERENCE TO RELATED APPLICATION

This application claims priority to U.S. Provisional Application No. 63/080,972 filed Sep. 21, 2020, the content of which is incorporated herein by reference in its entirety.

TECHNICAL FIELD

The present application relates generally to an apparatus and a method for sidelink discontinuous reception.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application.

Long-term Evolution, LTE, is a standard for wireless communication that seeks to provide improved speed and capacity for wireless communications by using new modulation/signal processing techniques. The standard was proposed by the $3^{rd}$ Generation Partnership Project, 3GPP. Since its inception, LTE has seen extensive deployment in a wide variety of contexts involving the communication of data. In recent years, the exponential growth of smartphones and the traffic they generate have become a major challenge of the industry. 3GPP has been continuing to alleviate this challenge by enhancing LTE standards to further improve capacity and performance and introducing improvements for system robustness.

3GPP fifth generation, 5G, or next generation, NG, system, may support a number of use cases and features. These use cases are, but not limited to: enhanced mobile broadband, eMBB, and ultra-reliable low-latency-communication, URLLC, as well as massive machine type communication, mMTC. 5G is mostly built on a new radio, NR, but a 5G (or NG) network can also build on LTE radio. NR is expected to deliver extreme broadband and ultra-robust, low latency connectivity and massive networking to support the Internet of Things, IoT. With IoT and machine-to-machine, M2M, communication becoming more widespread, there will be a growing need for designs that meet the needs of lower power, high data rate, and long battery life. It is noted that, in 5G, the nodes that can provide radio access functionality to a user equipment (i.e., similar to eNB in LTE) may be named gNB when built on NR radio and may be named NG-eNB when built on LTE radio.

BRIEF SUMMARY

This section is intended to include examples and is not intended to be limiting.

In an example embodiment, a method includes by a first user equipment, UE, receiving a configuration of a resource pool for sidelink, SL, communication; determining there is a need for assistance from one or more second UEs in proximity in resource reservation or resource selection from the configured resource pool for SL communication of the first UE; sending a request over SL for the needed assistance from the one or more second UEs in proximity based on the determination; monitoring and receiving possible response from the one or more second UEs in proximity which includes recommended resource from the configured resource pool for SL communication of the first UE; selecting resource for SL communication of the first UE by taking into account the received response; and performing SL communication using the selected resource.

In an example embodiment, an apparatus, when operating as a first UE, includes one or more processors and one or more memories including computer program code. The one or more memories and the computer program code are configured to, with the one or more processors, cause the apparatus to receive a configuration of a resource pool for sidelink, SL, communication; determine there is a need for assistance from one or more second UEs in proximity in resource reservation or resource selection from the configured resource pool for SL communication of the apparatus; send a request over SL for the needed assistance from the one or more second UEs in proximity based on the determination; monitor and receive possible response from the one or more second UEs in proximity which includes recommended resource from the configured resource pool for SL communication of the apparatus; select resource for SL communication of the apparatus by taking into account the received response; and perform SL communication using the selected resource.

In an example embodiment, an apparatus, when operating as a first UE, includes means for receiving a configuration of a resource pool for sidelink, SL, communication; means for determining there is a need for assistance from one or more second UEs in proximity in resource reservation or resource selection from the configured resource pool for SL communication of the apparatus; means for sending a request over SL for the needed assistance from the one or more second UEs in proximity based on the determination; means for monitoring and receiving possible response from the one or more second UEs in proximity which includes recommended resource from the configured resource pool for SL communication of the apparatus; means for selecting resource for SL communication of the apparatus by taking into account the received response; and means for performing SL communication using the selected resource.

In an example embodiment, a computer program product includes a computer-readable storage medium bearing computer program code embodied therein for use with a computer. The computer program code includes: by a first UE, code for receiving a configuration of a resource pool for sidelink, SL, communication; code for determining there is a need for assistance from one or more second UEs in proximity in resource reservation or resource selection from the configured resource pool for SL communication of the first UE; code for sending a request over SL for the needed assistance from the one or more second UEs in proximity based on the determination; code for monitoring and receiving possible response from the one or more second UEs in proximity which includes recommended resource from the configured resource pool for SL communication of the first UE; code for selecting resource for SL communication of the first UE by taking into account the received response; and code for performing SL communication using the selected resource.

In an example embodiment, a method includes by a second user equipment, UE, receiving a configuration of a resource pool for sidelink, SL, communication; receiving a request over SL from a first UE in proximity for a needed assistance in resource reservation or resource selection from the configured resource pool for SL communication of the first UE; determining whether a recommended resource from the configured resource pool is available; and sending a response to the first UE in proximity based on the determination.

In an example embodiment, an apparatus, when operating as a second UE, includes one or more processors and one or more memories including computer program code. The one or more memories and the computer program code are configured to, with the one or more processors, cause the apparatus to receive a configuration of a resource pool for sidelink, SL, communication; receive a request over SL from a first UE in proximity for a needed assistance in resource reservation or resource selection from the configured resource pool for SL communication of the first UE; determine whether a recommended resource from the configured resource pool is available; and send a response to the first UE in proximity based on the determination.

In an example embodiment, an apparatus, when operating as a second UE, includes means for receiving a configuration of a resource pool for sidelink, SL, communication; means for receiving a request over SL from a first UE in proximity for a needed assistance in resource reservation or resource selection from the configured resource pool for SL communication of the first UE; means for determining whether a recommended resource from the configured resource pool is available; and means for sending a response to the first UE in proximity based on the determination.

In an example embodiment, a computer program product includes a computer-readable storage medium bearing computer program code embodied therein for use with a computer. The computer program code includes: by a second UE, code for receiving a configuration of a resource pool for sidelink, SL, communication; code for receiving a request over SL from a first UE in proximity for a needed assistance in resource reservation or resource selection from the configured resource pool for SL communication of the first UE; code for determining whether a recommended resource from the configured resource pool is available; and code for sending a response to the first UE in proximity based on the determination.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for support of sidelink discontinuous reception, DRX, is not intended to limit the scope of certain embodiments but is representative of selected example embodiments.

The features, structures, or characteristics of example embodiments described throughout this specification may be combined in any suitable manner in one or more example embodiments. For example, the usage of the phrases "example embodiment" "certain embodiments," "some embodiments," or other similar language, throughout this specification refers to the fact that a particular feature, structure, or characteristic described in connection with an embodiment may be included in at least one embodiment. Thus, appearances of the phrases "in an example embodiment", "in certain embodiments," "in some embodiments," "in other embodiments," or other similar language, throughout this specification do not necessarily all refer to the same group of embodiments, and the described features, structures, or characteristics may be combined in any suitable manner in one or more example embodiments. In addition, the phrase "set of" refers to a set that includes one or more of the referenced set members. As such, the phrases "set of," "one or more of," and "at least one of," or equivalent phrases, may be used interchangeably. Further, "or" is intended to mean "and/or", unless explicitly stated otherwise.

Figure 1:
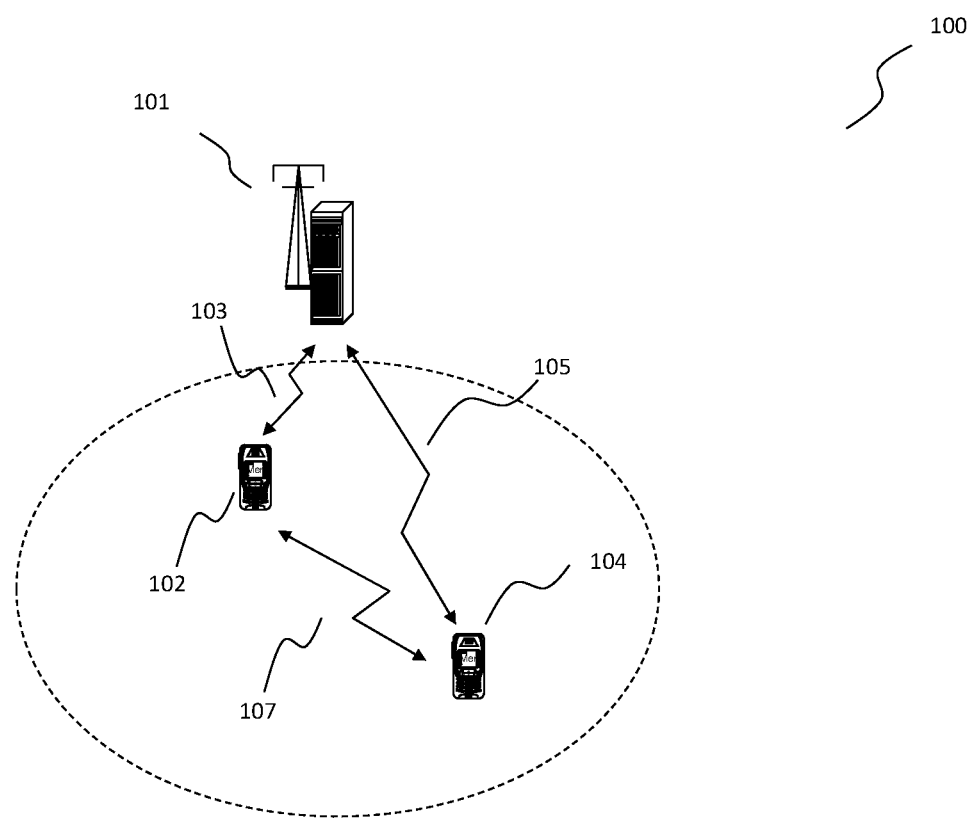
FIG. 1 illustrates an example communication system in which various example embodiments of the application implement.

FIG. 1 illustrates an example communication system 100 in which various embodiment of the application can be implemented. The example communication system 100 comprises a network element, NE, 101, such as for example, a gNB or a NG-eNB connecting to a core network that is not shown for brevity. In the example scenario of FIG. 1, the NE 101 serves two user equipments, UEs, 102 and 104 via wireless links 103 and 105, respectively. In this example, the UEs 102 and 104 may also communicate with each other via a wireless sidelink, SL, 107. Although just one NE and two UEs are shown in FIG. 1, it is only for the purpose of illustration and the example communication system 100 may comprise any number of NE(s) and UE(s).

The new radio, NR, SL will be enhanced to support wider use cases including public safety and commercial applications. The power saving is considered as one of the key requirements for those use cases. Power saving enables UE with battery constraint to perform sidelink operations in a power efficient manner $3^{rd}$ Generation Partnership Project, 3GPP, release 16, Rel-16, NR sidelink is designed based on the assumption of "always-on" when UE operates sidelink, e.g., only focusing on UEs installed in vehicles with sufficient battery capacity. Solutions for power saving in Rel-17 are required for vulnerable road users, VRUs, in vehicle-to-everything, V2X, use cases and for UEs in public safety and commercial use cases where power consumption in the UEs needs to be minimized.

With respect to resource allocation, aspects of NR may specify resource allocation for reducing power consumption of UE. There are two resource allocation modes. In mode 1 operation resource selection, the resources may be granted by the network, and, therefore, it may ensure that the SL resources do not overlap. In mode 2 resource selection, however, the UE may autonomously select SL transmission resource from a pool of resources within a resource selection window [n, n+x], based on the outcome of a sensing procedure occurring in the time [n−y, n], wherein x and y stand for the lengths of the resource selection window and the sensing window, respectively. The sensing procedure is based on the resource reservation information of other nearby UEs from their transmitted SL control information, SCI. In NR SL, the SCI indicates the resource and other transmission parameters used by a SL transmitting UE for transmitting transport block of SL data and other control information such as channel state information, CSI, report. The SCI consists of two parts: the $1^{st}$ stage SCI on physical SL control channel, PSCCH, carries the resource allocation and modulation and coding scheme, MCS, related information, which are also used for sensing in Mode 2 resource allocation; and the $2^{nd}$ stage SCI on physical SL shared channel, PSSCH, carries the hybrid automatic repeat request, HARQ, and SL L2 identifiers related information.

For inter-UE coordination, aspects of NR may specify enhancements in mode 2 operation for enhanced reliability and reduced latency in consideration of both packet reception ratio, PRR, and packet inter-reception, PIR. Related to this is inter-UE coordination, where a set of resources that is determined at a first UE, UE-A, is sent to a second UE, UE-B, in mode 2 operation, and the UE-B takes the set of resources into account in resource selection for the UE-B's transmission.

With respect to SL discontinuous reception, DRX, for broadcast, groupcast, and unicast, aspects of NR may define on- and off-durations in SL and specify the corresponding UE procedure, specify a mechanism to align SL DRX wake-up time among the UEs communicating with each other or may specify a mechanism to align SL DRX wake-up time with Uu DRX wake-up timing in an in-coverage UE.

Figure 2:
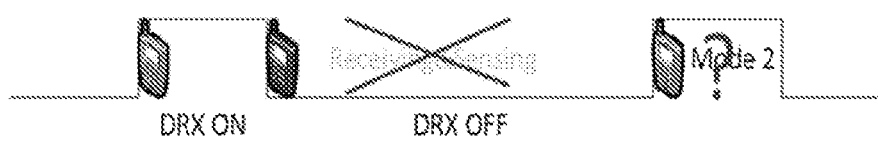
FIG. 2 illustrates the problem on sensing-based resource allocation in case of sidelink discontinuous reception.

In NR SL, the current sensing-based Mode 2 resource allocation relies on continuously monitoring and receiving at least $1^{st}$ stage SCI transmitted over PSCCH on a shared pool. The sensing history within the sensing window (e.g., 100 ms or 1100 ms as specified in 3GPP TS 38.331) is used for the resource selection at individual UE in Mode 2 on the shared pool. When SL DRX is enabled for SL UE in Mode 2, the SL UE will not listen to or receive SL including SCI transmitted over PSCCH during OFF period of SL DRX cycle. As sensing in SL Mode 2 relies on the received SCIs from SL UEs in proximity, the sensing history is not available at least at the beginning of ON period when UE wakes up in ON period of SL DRX cycle. Therefore, the current sensing-based Mode 2 resource allocation cannot be used from the start of ON period if SL UE has SL control plane, CP, or user plane, UP, data to transmit over SL as illustrated in FIG. 2.

Furthermore, if ON period of SL DRX cycle is less than a minimum sensing window (e.g., 100 ms) and OFF period of SL DRX cycle is large than the minimum sensing window (e.g., 100 ms), the current sensing-based Mode 2 cannot be used at all for UE with such the SL DRX cycle. Therefore, some enhancements to Mode 2 in order to support UE with SL DRX configured to use the shared pool of the current sensing-based Mode 2 are needed.

In an example embodiment, a method to enable and facilitate a support for UE with SL DRX configured to use a configured resource pool of the sensing-based SL communication during the ON period of SL DRX cycle is provided. The method is based on using a UE-assisted resource allocation for at least a time interval T1. The time interval T1 may be set to the minimum of a sensing window and the ON period of DRX cycle, starting from the start of the ON period, as configured to UE for example. When multiple sensing windows are configured, the time interval T1 may be set as the minimum of the minimum sensing window and the ON period of DRX cycle.

In an example embodiment, UE1 with SL DRX, such as for example, UE 102 of FIG. 1, is configured by a serving network via common (e.g., system information) or dedicated signaling, with rules or resource pools for sending and receiving SL messages, as detailed in the following illustration. The configuration may be based on the UE1's capability of supporting UE-assisted resource allocation, which has been received by the serving network.

UE1, at the start of the ON period or when having SL data to send within the time interval T1 defined above, may send a request to other capable UEs in proximity, denoted as UE2, such as for example, UE 104 of FIG. 1, for assistance in resource selection in the configured resource pool. The request may specify a targeted time interval for SL communication. The targeted time interval may be specified based on a rule, for example, specified as within T1, specified as one or multiple of the resource selection window for the sensing-based resource selection; specified in dependence of quality of service, QoS, attributes of the SL data; or specified in dependence of load status of the configured resource pool such as channel busy ratio, CBR, measured by UE1 on the configured resource pool.

In an example embodiment, the request may include a reference SL resource which is selected by UE1 from the configured resource pool using, for example, random selection or partial sensing, for a possible reservation for the targeted time interval. This may also represent the resource demand of UE1 for the targeted time interval.

In an example embodiment, the request may include a predefined cause for requesting the assistance from other capable UEs in proximity.

In an example embodiment, the request may include a SL QoS parameter such as priority on needed resource(s).

In an example embodiment, the request may be sent by UE1 over SL using resource selected from a (pre-)configured exceptional pool or from the configured resource pool using random selection or partial sensing in case the total of OFF period(s) within the minimum sensing window is no longer than a preconfigured threshold. This means if the total of OFF period(s) is too long, the partial sensing may not be possible.

UE1 may receive none, one or more responses from other UE(s) in proximity, UE2. In an example embodiment, the response may indicate recommended resource for UE1 for the targeted time interval in case that the recommended resource is at least partially different from the reference resource, or that the reference resource is available, or that there is no available resource for UE1. Based on the received response, UE1 may select the best suitable resource for SL communication with possible resource reservation for the targeted time interval. The targeted time interval may be set by UE2 for the recommended resource and indicated in the response, at least in case when it is different from the targeted time interval indicated by UE1 in the request. The setting of the targeted time interval by UE2 may be adapted to, for examples, the recommended resource, QoS parameter indicated in the request, load status of the configured resource pool such as CBR measured by UE2 on the configured resource pool.

In an example embodiment, the recommended resource is at least substantially equivalent to the reference resource.

In an example embodiment, in case no response is received within a predefined time interval starting from the instant when UE1 sends the request, UE1 may be configured to reserve and use the reference resource for SL communication within the targeted time interval. This may be made conditional on that CBR measurement at UE1 is under a threshold for example. As another option, UE1 may be configured to reselect the reference resource and send the request again if no response is received. In case multiple responses are received, UE1 may be configured to select among the recommended resources with the following options as examples: (i) the recommended resource from one response depending on signal quality of received responses or source UEs of responses; (ii) the overlapping resource of the recommended resources from the received multiple responses; or (iii) the accumulated resource of multiple recommended resources of the multiple responses.

In an example embodiment, UE2, upon receiving the request for assistance in resource selection in the configured resource pool from UE1 may: (a) either avoid to use the reference resource for the targeted time interval as indicated in the request of UE1 in case UE2 determines that the reference resource from UE1 does not cause collision to SL communication of UE2 and other UEs in proximity of UE2 based on the sensing history of UE2 and therefore skip sending a response to UE1; or (b) send a response to UE1 with a recommended resource for UE1.

In an example embodiment, a UE2 may receive multiple requests from different UE 1. In this case, the recommended resource in the response to different UE1 may be: (1) same, or (2) different. The configuration on (i), (ii) or (iii) above and (1) or (2) here may be complied with each other. For examples, (i) or (iii) may be configured together with (1) if UE1 can have more available resources to be selected; or (ii) together with (2) if resource collision between different UE1 need to be avoided.

In an example embodiment, in case there is no available resource for UE1, UE1 may be configured to use an exceptional pool for SL communication for the targeted time interval or at least for resending the request.

In an example embodiment, the response may be sent by UE2 using the configured resource pool or the (pre-)configured exceptional pool.

The request-response described above may be realized using either L1 or higher layer signaling. The former may be based on, e.g., the first-stage SCI sent on PSCCH with new SCI format. The latter may be based on, e.g., introducing a new L2 destination ID for sending/receiving the assistance request.

Figure 3:
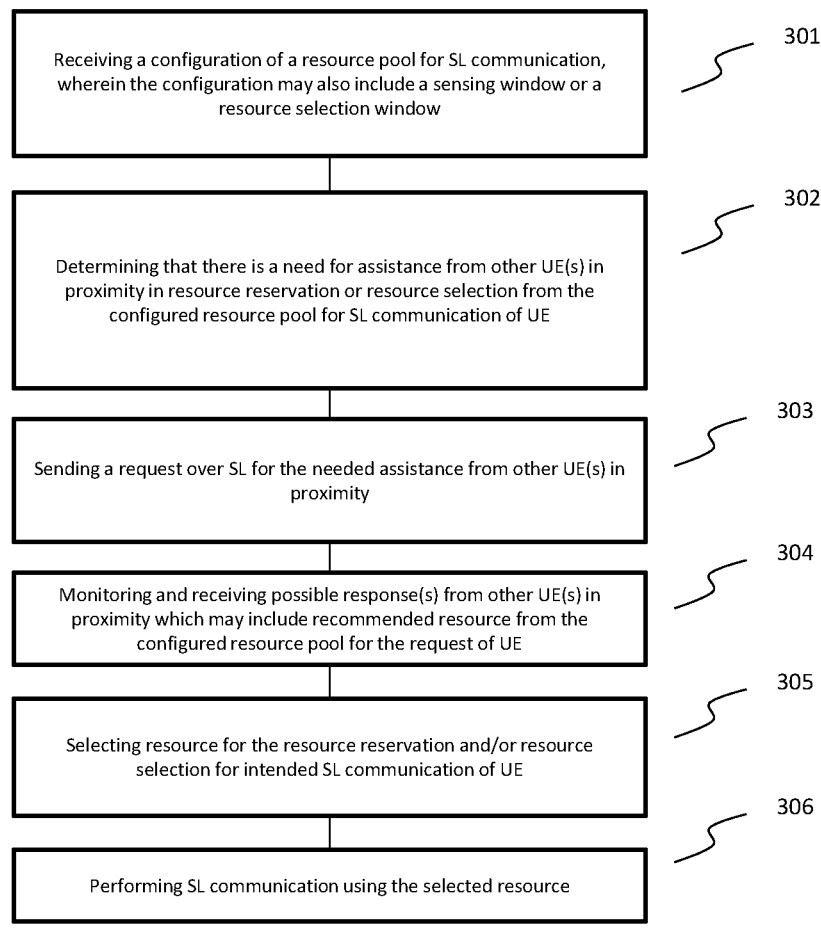
FIG. 3 describes a block diagram for some operation of a user equipment, UE, according to an example embodiment.

FIG. 3 describes a block diagram for some operation of a UE according to an example embodiment. In FIG. 3, a UE configured with SL DRX, such as for example, UE 102 of FIG. 1, may receive configuration of a resource pool for SL communication at 301. In an example embodiment, the configuration may include a rule for usage of the configured resource pool by the SL UE during ON period of SL DRX. The configuration may also include at least one of a sensing window or a resource selection window. At 302, the UE may determine that there is a need for assistance from other UE(s) in proximity in resource reservation or resource selection from the configured resource pool for SL communication. In an example embodiment, the determination is performed at the start of the ON period or when the UE has SL data to send within a time interval T1, which may be set to the minimum of the configured sensing window and the ON period. When multiple sensing windows are configured, the time interval T1 may be set as the minimum of the minimum sensing window and the ON period.

At 303, the UE may send a request for the needed assistance from other UE(s) in proximity. The request may be sent over SL using resource selected from a (pre-)configured exceptional pool or from the configured resource pool. In an example embodiment, the resource for sending the request is selected using a random selection or using partial sensing. In an example embodiment, the request may specify a targeted time interval for SL communication. The targeted time interval may be for example one or multiple of the resource selection window for the sensing-based resource selection. The request may also include a reference SL resource which is selected by the UE from the configured resource pool, e.g., using random selection or partial sensing, for a possible reservation for the targeted time interval.

At 304, the UE may monitor and receive possible response(s) from other UE(s) in proximity. The response(s) may be sent by other UE(s) using the configured resource pool or the (pre-)configured exceptional pool, and may include recommended resource from the configured resource pool for the request of the UE. The UE may select resource for intended SL communication based on the received response(s) at 305 and perform SL transmission or reception using the selected resource at 306.

Figure 4:
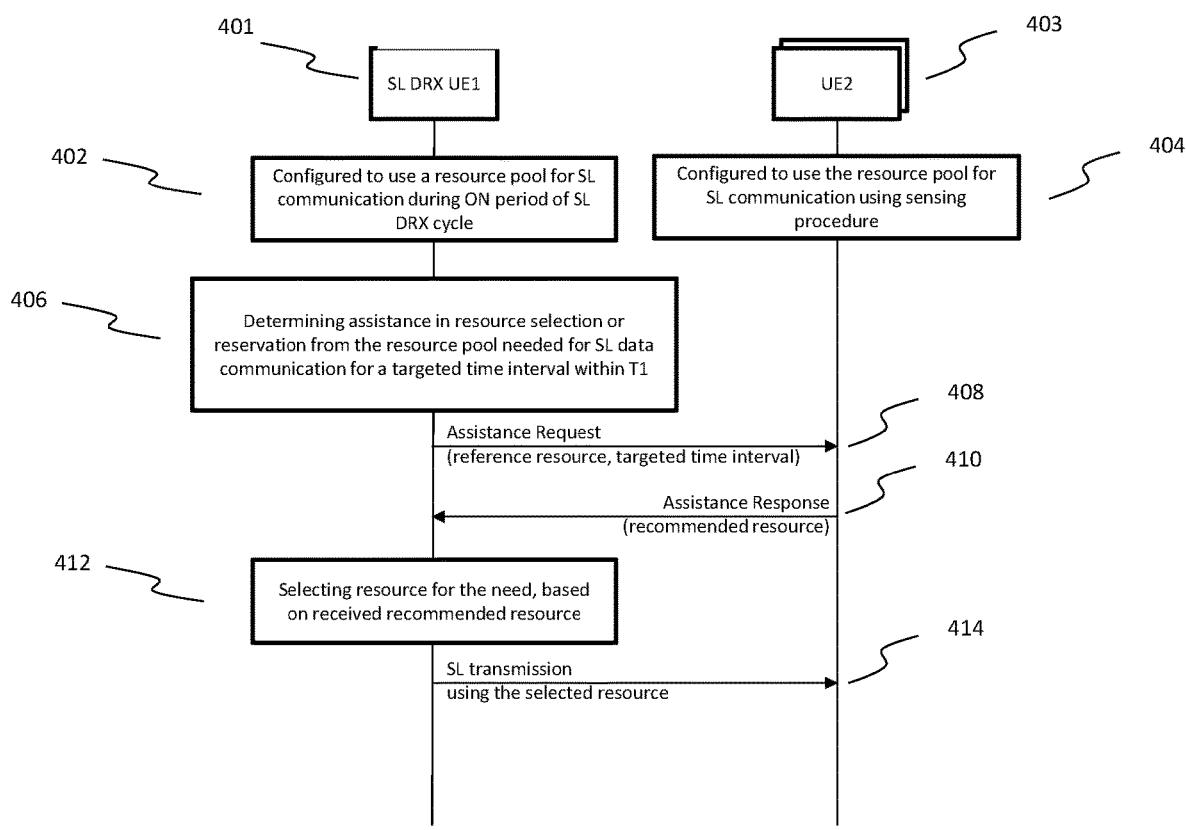
FIG. 4 provides a flowchart to illustrate some UE procedures according to an example embodiment.

FIG. 4 provides a flowchart to illustrate some UE procedures according to an example embodiment. As an example embodiment, FIG. 4 shows a UE1 401, such as for example, the UE 102 of FIG. 1, configured with SL DRX, and one or more other UEs in proximity, denoted as UE2, such as for example, the UE 104 of FIG. 1. While both UE1 and UE2 are configured to use a resource pool for SL data communication based on sensing procedure at 402 and 404, respectively, UE1 may not perform the sensing procedure as intended due to the SL DRX cycle. Hence, at 406 the UE1 may need to determine whether assistance from UE2 in resource selection or reservation from the configured resource pool is needed. The determination can be done at the start of the ON period of DRX cycle or when UE1 has SL data to send within a time interval T1. UE1 may also determine a targeted time interval for SL communication. If it is determined that an assistance from UE2 is needed, UE1 may send a request for assistance to UE2 in proximity at 408, wherein the request may include the targeted time interval or a reference resource which is selected by UE1 from the configured resource pool according to certain rule, for example using a random selection or partial sensing.

After receiving the assistance request from UE1, one or more UE2 may send an assistance response at 410 indicating a recommended resource for UE1 for SL communication during the targeted time interval. In other example embodiment, the assistance response may indicate that there is no available resource for UE1. Based on the received none, one or more recommended resource, UE1 may select a resource for intended SL communication at 412 and perform the SL transmission to or reception from UE2 or other UE(s) not shown in FIG. 4 using the selected resource at 414.

In the example embodiment illustrated by FIG. 4, UE2 which receives the request from UE1 and is able to perform the sensing-based resource allocation on the configured resource pool may determine and select the recommended resource for UE1. The recommended resource, in one example, is at least substantially equivalent to the reference resource provided in the request of UE1. In one option, UE2 may skip sending the response if UE2 determines that the reference resource of UE1, as indicated in the request, is available in proximity of UE2, or that the reference resource of UE1 does not cause collision to SL communication of UE2 and other UEs in proximity of UE2 based on the sensing history of UE2.

Figure 5:
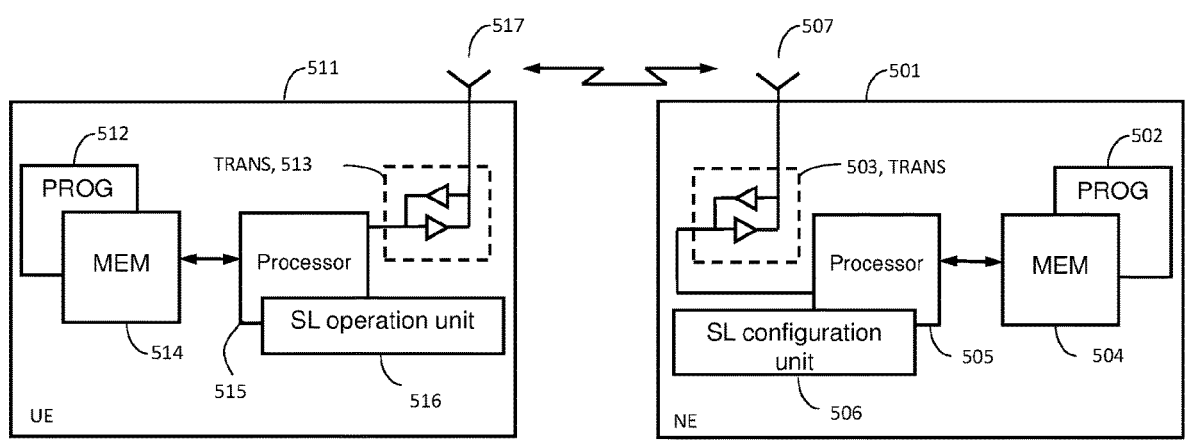
FIG. 5 illustrates a simplified block diagram of various example apparatuses that are suitable for use in practicing various example embodiments of this application.

Reference is made to FIG. 5 for illustrating a simplified block diagram of various example apparatuses that are suitable for use in practicing various example embodiments of this application. In FIG. 5, a network element, NE, 501, such as for example, the NE 101 of FIG. 1, is adapted for communication with a UE 511, such as for example, the UE 102 or 104 of FIG. 1. The UE 511 includes at least one processor 515, at least one memory, MEM, 514 coupled to the at least one processor 515, and a suitable transceiver, TRANS, 513 (having a transmitter, TX, and a receiver, RX) coupled to the at least one processor 515. The at least one MEM 514 stores a program, PROG, 512. The TRANS 513 may include or be coupled to one or more antennas 517 and is for bidirectional wireless communications with the NE 501 or other UE(s) in proximity, which is not shown in this figure.

The NE 501 includes at least one processor 505, at least one MEM 504 coupled to the at least one processor 505, and a suitable TRANS 503 (having a TX and a RX) coupled to the at least one processor 505. The at least one MEM 504 stores a PROG 502. The TRANS 503 may include or be coupled to one or more antennas 507 and is for bidirectional wireless communications with the UE 511. The NE 501 may be coupled to one or more cellular networks or systems, which is not shown in this figure.

As shown in FIG. 5, the NE 501 may further include a SL configuration unit 506. The unit 506, together with the at least one processor 505 and the PROG 502, may be utilized by the NE 501 in conjunction with various example embodiments of the application, as described herein.

As shown in FIG. 5, the UE 511 may further include a SL operation unit 516. The unit 516, together with the at least one processor 515 and the PROG 512, may be utilized by the UE 511 in conjunction with various example embodiments of the application, as described herein.

In general, the various example embodiments of the apparatus 501 can include a node, host, or server in a communications network or serving such a network. For example, apparatus 501 may be a network node, satellite, base station, a Node B, an evolved Node B, eNB, 5G Node B or access point, next generation Node B, NG-NB or gNB, or a WLAN access point, associated with a radio access network, such as a LTE network, 5G or NR.

It should be understood that, in some example embodiments, apparatus 501 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 501 represents a gNB, it may be configured in a central unit, CU, and distributed unit, DU, architecture that divides the gNB functionality. In such an architecture, the CU may be a logical node that includes gNB functions such as transfer of user data, mobility control, radio access network sharing, positioning, or session management, etc. The CU may control the operation of DU(s) over a front-haul interface. The DU may be a logical node that includes a subset of the gNB functions, depending on the functional split option. It should be noted that one of ordinary skill in the art would understand that apparatus 501 may include components or features not shown in FIG. 5.

In general, the various example embodiments of the apparatus 511 can include, but are not limited to, cellular phones, personal digital assistants having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions. In an embodiment, apparatus 511 may be a node or element in a communications network or associated with such a network, such as a UE, mobile equipment, ME, mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display, a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 511 may be implemented in, for instance, a wireless hand-held device, a wireless plug-in accessory, or the like. It should be noted that one of ordinary skill in the art would understand that apparatus 501 may include components or features not shown in FIG. 5.

The example embodiments of this disclosure may be implemented by computer software or computer program code executable by one or more of the processors 505, 515 of the NE 501 and the UE 511, or by hardware, or by a combination of software and hardware.

At least one of the PROGs 502 and 512 is assumed to include program instructions that, when executed by the associated processor, enable the electronic apparatus to operate in accordance with the example embodiments of this disclosure, as discussed herein.

The TRANS 503 and 513 may include, for example, a plurality of radio interfaces that may be coupled to the antenna(s) 507 and 517, respectively. The radio interfaces may correspond to a plurality of radio access technologies including one or more of GSM, WCDMA, NB-IoT, LTE, 5G, WLAN, Bluetooth, BT-LE, NFC, radio frequency identifier, ultrawideband, MulteFire, and the like. The radio interface may include components, such as filters, converters (for example, digital-to-analog converters and the like), mappers, a Fast Fourier Transform module, and the like, to generate symbols for a transmission and to receive symbols. As such, TRANS 503 and 513 may be configured to modulate information on to a carrier waveform for transmission by the antenna(s) and demodulate information received via the antenna(s) for further processing by other elements of apparatus 501 and 511, respectively. In other embodiments, TRANS 503 and 513 may be capable of transmitting and receiving signals or data directly. Additionally or alternatively, in some embodiments, apparatus 501 and/or 511 may include an input and/or output device.

The MEMs 504 and 514 may be of any type suitable to the local technical environment and may be implemented using any suitable data storage technology, such as semiconductor-based memory devices, flash memory, magnetic memory devices and systems, optical memory devices and systems, fixed memory and removable memory, as non-limiting examples. For example, memory 504 and 514 can be comprised of any combination of random access memory, read only memory, static storage such as a magnetic or optical disk, hard disk drive, or any other type of non-transitory machine or computer readable media. The instructions stored in memory 504 or 514 may include program instructions or computer program code that, when executed by processor 505 or 515, enable the apparatus 501 or 511 to perform tasks as described herein.

In an embodiment, apparatus 501 or 511 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 505/515 or apparatus 501/511.

The processors 505 and 515 may be of any type suitable to the local technical environment, and may include one or more of general purpose computers, special purpose computers, microprocessors, digital signal processors, field-programmable gate arrays, application-specific integrated circuits, and processors based on multi-core processor architecture, as non-limiting examples. While a single processor 505 and 515 is shown in NE and UE of FIG. 5, respectively, multiple processors may be utilized according to other embodiments. For example, it should be understood that, in certain embodiments, apparatus 501 or 511 may include two or more processors that may form a multiprocessor system (e.g., in this case processor 505 or 515 may represent a multiprocessor) that may support multiprocessing. In certain embodiments, the multiprocessor system may be tightly coupled or loosely coupled (e.g., to form a computer cluster).

Without in any way limiting the scope, interpretation, or application of the claims appearing below, a technical effect of one or more of the example embodiments disclosed herein may be allowing UE configured with SL DRX, which may not be able to perform the full sensing based resource allocation when waking up from OFF period of DRX cycle, to use a regular resource pool shared with other UEs that are able to perform the full sensing based resource allocation. The proposed method is effective with low overhead and impact on the current design.

Embodiments of the present invention may be implemented in software, hardware, application logic or a combination of software, hardware and application logic. The software, application logic and/or hardware may reside on an apparatus such as a user equipment, a gNB or other mobile communication devices. If desired, part of the software, application logic and/or hardware may reside on a NE 501, part of the software, application logic and/or hardware may reside on a UE 511, and part of the software, application logic and/or hardware may reside on other chipset or integrated circuit. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device. A computer-readable medium may comprise a non-transitory computer-readable storage medium that may be any media or means that can contain or store the instructions for use by or in connection with an instruction execution system, apparatus, or device.

It is also noted herein that while the above describes example embodiments of the invention, these descriptions should not be viewed in a limiting sense. Rather, there are several variations and modifications which may be made without departing from the scope of the present invention. For example, although 5G SL mode 2 is used as example system in which various example embodiments of the application implement, it should be noted that the invention can be applied to a number of radio access technologies and resource allocation modes.

Further, the various names used for the described parameters are not intended to be limiting in any respect, as these parameters may be identified by any suitable names.

If desired, the different functions discussed herein may be performed in a different order and/or concurrently with each other. Furthermore, if desired, one or more of the above-described functions may be optional or may be combined. As such, the foregoing description should be considered as merely illustrative of the principles, teachings and example embodiments of this invention, and not in limitation thereof.

According to a first embodiment, a method performed by a UE may include receiving a configuration of a resource pool for sidelink communication; determining there is a need for assistance from one or more other UEs in proximity in resource reservation or resource selection from the configured resource pool for SL communication of the UE; sending a request over SL for the needed assistance from the one or more other UEs in proximity based on the determination; monitoring and receiving possible response from the one or more other UEs in proximity which may include recommended resource from the configured resource pool for the request of UE; selecting resource for SL communication of the UE by taking into account the received response; and performing SL communication using the selected resource.

In a variant, the method further includes receiving a request over SL from a UE in proximity for a needed assistance in resource reservation or resource selection from the configured resource pool for SL communication of the UE; determining whether a recommended resource from the configured resource pool is available; and sending a response to the UE in proximity based on the determination.

In a further variant, the received configuration may also include a sensing window or a resource selection window.

In a further variant, the configuration may include a rule for usage of the configured resource pool by the SL UE during ON period of SL DRX.

In a further variant, the determination there is a need for assistance is performed at the start of the ON period or when the UE has SL data to send within a time interval T1, which may be set to the minimum of the configured sensing window and the ON period.

In a further variant, the time interval T1 is set to the minimum of the minimum sensing window and the ON period.

In a further variant, the request or the response may be sent over SL using resource selected from a (pre-)configured exceptional pool or from the configured resource pool using a random selection or partial sensing.

In a further variant, the partial sensing is performed if the total of OFF period(s) within the sensing window is no longer than a preconfigured threshold.

In a further variant, the request or the response may specify a targeted time interval for SL communication.

In a further variant, the targeted time interval may be within T1, one or multiple of the resource selection window, in dependence of QoS attributes of the SL data, or in dependence of load status of the configured resource pool such as CBR measured by the UE on the configured resource pool.

In a further variant, the request may include a reference SL resource which is selected by the UE from the configured resource pool for a possible reservation for the targeted time interval.

In a further variant, the method may further include skipping sending the response if it is determined that the reference resource included in the request is available, or that the reference resource does not cause collision to SL communication of the UE and other UEs in proximity based on the sensing history.

In a further variant, the request may include a predefined cause for requesting the assistance from the one or more other UEs in proximity.

In a further variant, the request may include an SL QoS parameter such as priority on needed resources.

In a further variant, the response may include none, one or more recommended resources from the configured resource pool for the request of the UE.

In a further variant, the recommended resource is at least partially different from the reference resource, or at least substantially equivalent to the reference resource.

In a further variant, the response may indicate that the reference resource is available, or that there is no available resource for SL communication of the UE.

In a further variant, if no response is received, e.g., within a predefined time interval starting from transmitting the request, the method further includes reserving and using the reference resource for SL communication within the targeted time interval. In a further variant, the reference resource is reserved and used conditional on that a channel busy ratio measurement at the UE is under a threshold.

In a further variant, if no response is received, e.g., within a predefined time interval starting from transmitting the request, the method further includes reselecting the reference resource and sending the request again.

In a further variant, if multiple responses are received, when selecting resource for SL communication, the method includes selecting the recommended resource based on signal quality of received responses or source UEs of responses, selecting the overlapping resource of the recommended resources from the received multiple responses, or selecting the accumulated resource of multiple recommended resources of the multiple responses.

In a further variant, if the response indicates that there is no available resource for SL communication of the UE, the method further includes using the exceptional pool for the targeted time interval or for resending the request.

According to a second embodiment, an apparatus can include at least one processor and at least one memory and computer program code. The at least one memory and the computer program code can be configured to, with the at least one processor, cause the apparatus at least to perform a method according to the first embodiment, and any of its variants.

According a third embodiment, an apparatus can include means for performing the method according to the first embodiment, and any of its variants.

According to a fourth embodiment, a computer program product may encode instructions for performing a process including a method according to the first embodiment, and any of its variants.

According to a fifth embodiment, a non-transitory computer-readable medium may encode instructions that, when executed in hardware, perform a process including a method according to the first embodiment, and any of its variants.

According to a sixth embodiment, a computer program code may include instructions for performing a method according to the first embodiment, and any of its variants.

We claim:

1. An apparatus comprising:
   at least one processor; and
   at least one memory storing instructions that, when executed by the at least one processor, cause the apparatus at least to perform:
   when the apparatus is comprised in a first user equipment (UE):
   receiving a configuration of a resource pool for sidelink communication;
   determining there is a need for assistance from one or more second UEs, in proximity in resource reservation or resource selection from a configured resource pool for SL communication of the first UE;
   sending a request over SL for the needed assistance from the one or more second UEs in proximity based on the determination;
   monitoring and receiving a possible response from the one or more second UEs in proximity which includes a recommended resource from the configured resource pool for SL communication of the first UE;
   if a response is received, selecting resource for SL communication of the first UE by taking into account the received response; and
   performing SL communication using the selected resource, wherein the request or the response specifies a targeted time interval for SL communication; and
   when the apparatus is comprised in a second UE:
   receiving a configuration of a resource pool for SL communication;
   receiving a request over SL from a first UE in proximity for a needed assistance in resource reservation or resource selection from a configured resource pool for SL communication of the first UE;
   determining whether a recommended resource from the configured resource pool is available; and
   sending a response to the first UE in proximity based on the determination, wherein the request or the response specifies a targeted time interval for SL communication.

2. The apparatus according to claim 1, wherein the received configuration includes a sensing window or a resource selection window.

3. The apparatus according to claim 1, wherein the configuration includes a rule for usage of the configured resource pool by SL UE during ON period of SL discontinuous reception (DRX).

4. The apparatus according to claim 1, wherein the determination there is a need for assistance is performed at the start of an ON period or when the first UE has SL data to send within a time interval T1, which is set to the minimum of a configured sensing window and the ON period.

5. The apparatus according to claim 4, wherein the time interval T1 is set to the minimum of the minimum sensing window and the ON period, when multiple sensing windows are configured.

6. The apparatus according to claim 1, wherein the request or the response is sent over SL using resource selected from a pre-configured exceptional pool or from the configured resource pool using a random selection or partial sensing.

7. The apparatus according to claim 6, wherein the partial sensing is performed if the total of one or more OFF periods within the sensing window is no longer than a preconfigured threshold.

8. The apparatus according to claim 1, wherein the targeted time interval is within T1, one or multiple of the resource selection window, in dependence of QoS attributes of the SL data, or in dependence of load status of the configured resource pool.

9. The apparatus according to claim 1, wherein the request includes at least one of a reference SL resource which is selected by the first UE from the configured resource pool for a possible reservation for a targeted time interval, a predefined cause for requesting the assistance from the one or more second UEs in proximity, or an SL QoS parameter.

10. The apparatus according to claim 9, when the apparatus is comprised in the second UE, the instructions, when executed by the at least one processor, cause the apparatus at least to perform:
skipping sending the response if it is determined that the reference SL resource included in the request is available, or that the reference SL resource does not cause collision to SL communication of the first UE and the one or more second UEs in proximity based on sensing history.

11. The apparatus according to claim 9, wherein the recommended resource is at least partially different from the reference SL resource, or at least substantially equivalent to the reference SL resource.

12. The apparatus according to claim 9, wherein the response indicates that the reference SL resource is available, or that there is no available resource for SL communication of the first UE.

13. The apparatus according to claim 9, wherein the reference SL resource is reserved and used based on a condition that a channel busy ratio measurement at the first UE is under a threshold.

14. The apparatus according to claim 9, when the apparatus is comprised in the first UE, and if no response is received, the instructions, when executed by the at least one processor, cause the apparatus at least to perform: reserving and using the reference SL resource for SL communication within the targeted time interval, or reselecting the reference SL resource and sending the request again.

15. The apparatus according to claim 1, when the apparatus is comprised in the first UE, and if multiple responses are received, the selecting a resource for SL communication comprises selecting the recommended resource based on signal quality of received responses or source UEs of the responses, selecting an overlapping resource of the recommended resources from the received multiple responses, or selecting an accumulated resource of multiple recommended resources of the multiple responses.

16. The apparatus according to claim 1, when the apparatus is comprised in the first UE, and if the response indicates that there is no available resource for SL communication of the first UE, the instructions, when executed by the at least one processor, cause the apparatus at least to perform: using an exceptional pool for a targeted time interval or for resending the request.

17. A method, comprising:
by a first user equipment (UE),
receiving a configuration of a resource pool for sidelink (SL) communication;
determining there is a need for assistance from one or more second UEs in proximity in resource reservation or resource selection from a configured resource pool for SL communication of the first UE;
sending a request over SL for the needed assistance from the one or more second UEs in proximity based on the determination;
monitoring and receiving a possible response from the one or more second UEs in proximity which includes a recommended resource from the configured resource pool for SL communication of the first UE;
if a response is received, selecting resource for SL communication of the first UE by taking into account the received response; and
performing SL communication using the selected resource, wherein the request or the response specifies a targeted time interval for SL communication.

18. A method, comprising:
by a second UE,
receiving a configuration of a resource pool for SL communication;
receiving a request over SL from a first UE in proximity for a needed assistance in resource reservation or resource selection from a configured resource pool for SL communication of the first UE;
determining whether a recommended resource from the configured resource pool is available; and
sending a response to the first UE in proximity based on the determination, wherein the request or the response specifies a targeted time interval for SL communication.

19. A non-transitory computer-readable medium comprising program instructions that, when executed by an apparatus, cause the apparatus to perform at least the following:
when the apparatus is comprised in a first user equipment (UE):
receiving a configuration of a resource pool for sidelink communication;
determining there is a need for assistance from one or more second UEs, in proximity in resource reservation or resource selection from a configured resource pool for SL communication of the first UE;
sending a request over SL for the needed assistance from the one or more second UEs in proximity based on the determination;
monitoring and receiving a possible response from the one or more second UEs in proximity which includes a recommended resource from the configured resource pool for SL communication of the first UE;
if a response is received, selecting resource for SL communication of the first UE by taking into account the received response; and
performing SL communication using the selected resource, wherein the request or the response specifies a targeted time interval for SL communication; and
when the apparatus is comprised in a second UE:
receiving a configuration of a resource pool for SL communication;
receiving a request over SL from a first UE in proximity for a needed assistance in resource reservation or resource selection from a configured resource pool for SL communication of the first UE;
determining whether a recommended resource from the configured resource pool is available; and sending a response to the first UE in proximity based on the determination, wherein the request or the response specifies a targeted time interval for SL communication.

* * * * *